(12) United States Patent  (10) Patent No.: US 8,873,848 B2
Momonoi et al.  (45) Date of Patent: Oct. 28, 2014

(54) IMAGE PROCESSING APPARATUS AND IMAGE PROCESSING METHOD (71) Applicants: Yoshiharu Momonoi, Kanagawa (JP); Takayuki Arai, Tokyo (JP); Kazuyasu Ohwaki, Tokyo (JP)

(72) Inventors: Yoshiharu Momonoi, Kanagawa (JP); Takayuki Arai, Tokyo (JP); Kazuyasu Ohwaki, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 128 days.

(21) Appl. No.: 13/676,921

(22) Filed: Nov. 14, 2012

(65) Prior Publication Data
US 2013/0259368 A1    Oct. 3, 2013

(30) Foreign Application Priority Data

Mar. 29, 2012 (JP) ................................ 2012-077662

(51) Int. Cl.
G06K 9/00 (2006.01)
G06T 5/00 (2006.01)
(52) U.S. Cl.
CPC .......... G06T 5/00 (2013.01); G06T 2207/10004 (2013.01); G06T 5/008 (2013.01)
USPC ........................................................ 382/167
(58) Field of Classification Search
None
See application file for complete search history.

(56) References Cited

U.S. PATENT DOCUMENTS 4,684,906 A * 8/1987 Yokoyama .................... 333/143
7,130,474 B2 10/2006 Luo et al.
7,224,360 B2 5/2007 Tatsumi (Continued)

FOREIGN PATENT DOCUMENTS

JP       06187443 A     7/1994
JP     2003-132350     5/2003

(Continued)

OTHER PUBLICATIONS

S.A. Shafer, "Using Color to Separate Reflection Components," Computer Science Department—University of Rochester, TR 136, Apr. 1984, 29 pages, Rochester, NY.

(Continued)

Primary Examiner — Bhavesh Mehta
Assistant Examiner — Feng Niu
(74) Attorney, Agent, or Firm — Patterson & Sheridan, LLP (57) ABSTRACT According to one embodiment, an image processing apparatus includes: a reduction module configured to reduce image data that is input to output reduced data; an extraction module configured to extract a diffuse reflection component from the reduced data; an enlargement module configured to enlarge the diffuse reflection component to a size before reduction of the input image data to output enlarged data; a high-frequency acquisition module configured to acquire a high-frequency component removed by reduction from difference between the input image data and the reduced data; a high-frequency addition module configured to output first data obtained by adding the high-frequency component acquired to the enlarged data; and a gloss component acquisition module configured to acquire a gloss component from difference between the input image data and the first data.

5 Claims, 7 Drawing Sheets

(56) References Cited

U.S. PATENT DOCUMENTS

| | | |
|---|---|---|
| 2003/0085894 A1 | 5/2003 | Tatsumi |
| 2004/0021948 A1* | 2/2004 | Blsi et al. ............... 359/603 |
| 2008/0007747 A1 | 1/2008 | Chinen et al. |
| 2009/0165830 A1* | 7/2009 | Degel et al. ............... 134/134 |
| 2009/0201357 A1* | 8/2009 | Sakurai ............... 347/255 |
| 2013/0251288 A1* | 9/2013 | Kobiki et al. ............... 382/298 |

FOREIGN PATENT DOCUMENTS

| | | |
|---|---|---|
| JP | 2004-140792 | 5/2004 |
| JP | 4692856 | 3/2011 |
| JP | 4692856 | 6/2011 |
| JP | 2011135429 A | 7/2011 |
| WO | 2008/001942 | 1/2008 |

OTHER PUBLICATIONS

Japanese Decision to Grant a Patent on Japanese Application No. 2012-077662, dated Jan. 22, 2013.

P.J.Burt; E.H. Adelson, "The Laplacian Pyramid as a Compact Image Code", IEEE Transaction on communications, vol. COM-31, No. 4, Apr. 1983.

G.Guo, "Digital Anti-Aging in Face Images", IEEE International conference on Computer Vision, Nov. 2011, pp. 2510-2515.

European Search Report for Application No. 12192176.1-1906 dated Jun. 18, 2013.

* cited by examiner

IMAGE PROCESSING APPARATUS AND IMAGE PROCESSING METHOD

CROSS-REFERENCE TO RELATED APPLICATIONS

This application is based upon and claims the benefit of priority from Japanese Patent Application No. 2012-077662, filed on Mar. 29, 2012, the entire contents of which are incorporated herein by reference.

FIELD

Embodiments described herein relate generally to an image processing apparatus and an image processing method.

BACKGROUND

Conventionally widely known are image processing apparatuses that separate only gloss components from input image data to highlight the gloss components. Specifically, there has been developed a technology for separating diffuse reflection components and gloss components in a pixel to be a target by: using hues of an object in an image to extract the pixel; estimating diffuse reflection components indicating original color components of the surface from the pixel thus extracted; and using the diffuse reflection components thus estimated to separate colors that are changed by illumination.

To extract diffuse reflection components from image data, high processing capacity is required. As a result, hardware providing higher performance is required, thereby making a processor expensive.

In view of the circumstances described above, it is an object of the present invention to provide an image processing apparatus capable of separating diffuse reflection components and gloss components constituting image data efficiently.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

In general, according to one embodiment, an image processing apparatus comprises: a reduction module configured to reduce image data that is input to output reduced data; an extraction module configured to extract a diffuse reflection component from the reduced data; an enlargement module configured to enlarge the diffuse reflection component to a size before reduction of the input image data to output enlarged data; a high-frequency acquisition module configured to acquire a high-frequency component removed by reduction from difference between the input image data and the reduced data; a high-frequency addition module configured to output first data obtained by adding the high-frequency component acquired to the enlarged data; and a gloss component acquisition module configured to acquire a gloss component from difference between the input image data and the first data.

Exemplary embodiments of an image processing apparatus according to the present invention are described below in greater detail with reference to the accompanying drawings. The embodiments are not intended to limit the present invention. The image processing apparatus according to the embodiments, for example, separates gloss components and diffuse reflection components in input image, highlights the gloss components, and outputs an output image obtained by adding the gloss components to the input image. The processing performed on the gloss components is not limited to the processing in the embodiments. The image processing apparatus according to the embodiments is mounted on an optical device, such as a digital camera, and can be used for processing a captured image more efficiently, for example.

First Embodiment

An input image signal includes a pixel value for each pixel. A pixel value is an image signal comprising an intensity signal and a color signal based on a standard of the International Telecommunication Union (ITU), for example. A pixel value may be represented by either of a method for using three primary colors of RGB as components or method for converting RGB into an intensity signal and a color signal. In the first embodiment, for example, an explanation will be made of a method for using RGB corresponding to primary colors based on the ITU-RBT. 601 standard as components. Therefore, the pixel value of each pixel in input image is represented by an R channel having intensity of a red component, a G channel having intensity of a green component, and a B channel having intensity of a blue component. The R channel has a discretized pixel value of 0 to r0, the G channel has a discretized pixel value of 0 to g0, and the B channel has a discretized pixel value of 0 to b0.

A diffuse reflection component is generated by scattering of light incident on uneven surface of an object, and produces a unique color on the surface of the object different from a color of a light source. A gloss component is a component reflected by the boundary of the surface of the object.

Figure 1:
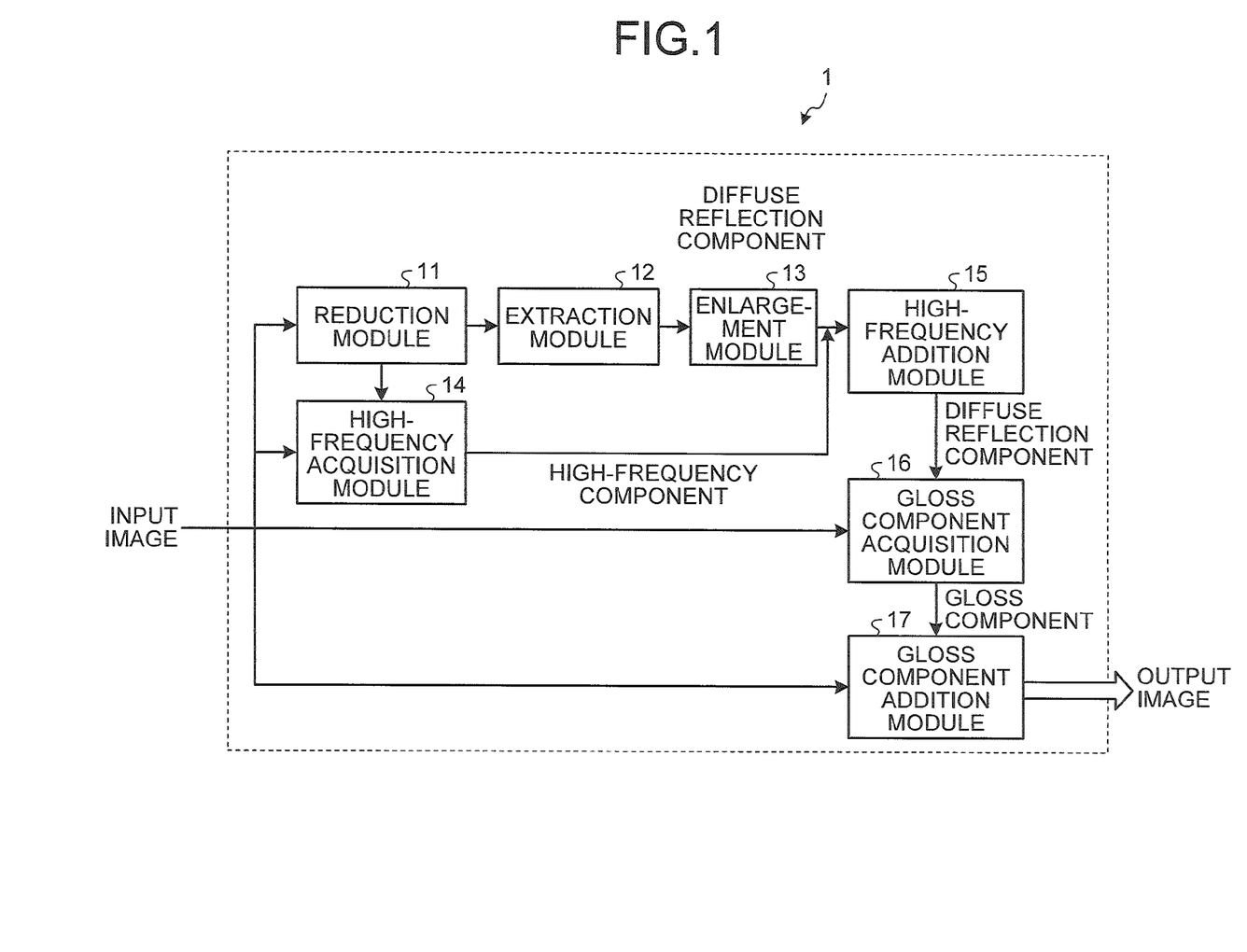
FIG. 1 is an exemplary block diagram of a functional configuration of an image processing apparatus according to a first embodiment.

As illustrated in FIG. 1, an image processing apparatus 1 comprises a reduction module 11, an extraction module 12, an enlargement module 13, a high-frequency acquisition module 14, a high-frequency addition module 15, a gloss component acquisition module 16, and a gloss component addition module 17. These modules may be realized as hardware or a computer program stored in a storage medium, such as a hard disk, and executed by a central processing unit (CPU). An output image obtained as a result of processing performed by the image processing apparatus 1 according to the first embodiment can be expressed by the following Equation:

$$O=I+K[I-e(f(s(I)))+H(I)]$$

where O represents an output image, I represents an input image, f(I) represents a function for calculating a diffuse reflection component, s(I) represents a function for reducing an image, e(I) represents a function for enlarging an image, K[I−f(I)] represents a function for performing predetermined processing on a gloss component, and H(I) represents a function for calculating a high-frequency component. In the first embodiment, processing for calculating a diffuse reflection component is performed on an image s (I) obtained by reducing an input image, and the diffuse reflection component is enlarged. The result is represented by e(f(s(I))). A high-frequency component thus lost is added to difference between the input image and the diffuse reflection component thus enlarged (enlarged data) to output first data. Subsequently, second data obtained by performing predetermined gloss processing on the first data is added to the input image, whereby an output image is obtained. The section that performs the processing will be described below in greater detail.

The reduction module 11 reduces an input image to a predetermined size. An existing method, such as downsampling, can be used for the reduction. In the reduction, because the frequency representable in the image is equal to or lower than the Nyquist frequency (one-half of the sampling frequency), a high-frequency component in the image is lost. For this reason, the high-frequency acquisition module 14 acquires in advance the high-frequency component to be lost. Specifically, the high-frequency acquisition module 14 acquires the high-frequency component from difference between the input image and the image thus reduced. Therefore, the high-frequency component acquired by the high-frequency acquisition module 14 is determined based on a ratio of reduction performed by the reduction module 11. The ratio of reduction performed by the reduction module 11 is determined based on how far a processing capacity required for subsequent processing related to extraction of a diffuse reflection component performed by the extraction module 12 is desired to be suppressed.

The extraction module 12 extracts a diffuse reflection component from the reduced image. To extract a diffuse reflection component, for example, a method using a dichromatic reflection model can be employed. In the dichromatic reflection model, I=Is+Id is satisfied where the intensity of reflected light is I, the intensity of a gloss component is Is, and the intensity of a diffuse reflection component is Id.

Specifically, each pixel of the input image thus acquired is projected onto a color space by values of RGB. The hue, the saturation, and the intensity are calculated by the following Equations using certain elements (Ix, Iy, Iz) projected onto the color space.

$$\text{hue} = \arctan \frac{I_y}{I_x} \quad (1)$$

$$\text{saturation} = \sqrt{I_x^2 + I_y^2} \quad (2)$$

$$\text{intensity} = I_Z \quad (3)$$

Figure 2:
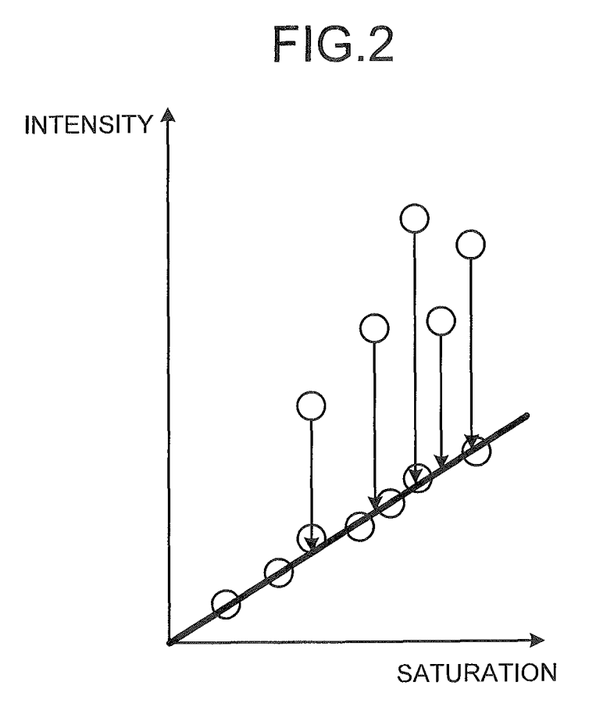
FIG. 2 is an exemplary schematic diagram in which the lowest intensity is plotted for each value of saturation of input image in the embodiment.

A plane is prepared in which classification is performed by the values of the hues with the saturation on the abscissa and the intensity on the ordinate. As illustrated in FIG. 2, the lowest intensity is plotted for each value of saturation. By plotting the lowest value, it is possible to select only the pixel of the diffuse reflection component from which influence of the gloss component is removed. These plots are positioned on a straight line from the origin. Therefore, a slope A can be calculated for each hue using the least-squares method for a straight line. A is calculated by the following Equation where (αr, αg, αb) is the reflectance of diffuse reflection.

$$A = \frac{\sqrt{2}}{3} \frac{\alpha_r + \alpha_g + \alpha_b}{\sqrt{(\alpha_r - \alpha_g)^2 + (\alpha_g - \alpha_b)^2 + (\alpha_b - \alpha_r)^2}} \quad (4)$$

A gloss component has the same saturation as that of a diffuse reflection component and different intensity from that of the diffuse reflection component. Therefore, if the intensity of the output image is determined from the saturation for all the pixels based on the following Equation using the slope A thus calculated, the intensity of all the pixels is the same value as the intensity of the diffuse reflection component. As a result, the gloss component is removed.

$$\text{intensity} = A \times \text{saturation} \quad (5)$$

The enlargement module 13 enlarges the diffuse reflection component thus obtained. In the first embodiment, the magnification of the enlargement is set such that the diffuse reflection component reaches the size before reduction. Alternatively, the magnification may be changed as appropriate such that the diffuse reflection component reaches a desired size.

The high-frequency addition module 15 adds the high-frequency component acquired by the high-frequency acquisition module 14 to the diffuse reflection component thus enlarged. Subsequently, the gloss component acquisition module 16 acquires a gloss component from difference between the input image and the diffuse reflection component acquired via the high-frequency addition module 15. At this time, no complicated calculation is required. Because the diffuse reflection component has already been acquired, the gloss component can be derived simply by acquiring the difference. Subsequently, the gloss component addition module 17 performs predetermined processing, which is processing for highlighting the gloss component in the first embodiment, on the gloss component thus acquired, and adds the gloss component to the input image. As a result, an output image in which the gloss component is highlighted is obtained.

Figure 3:
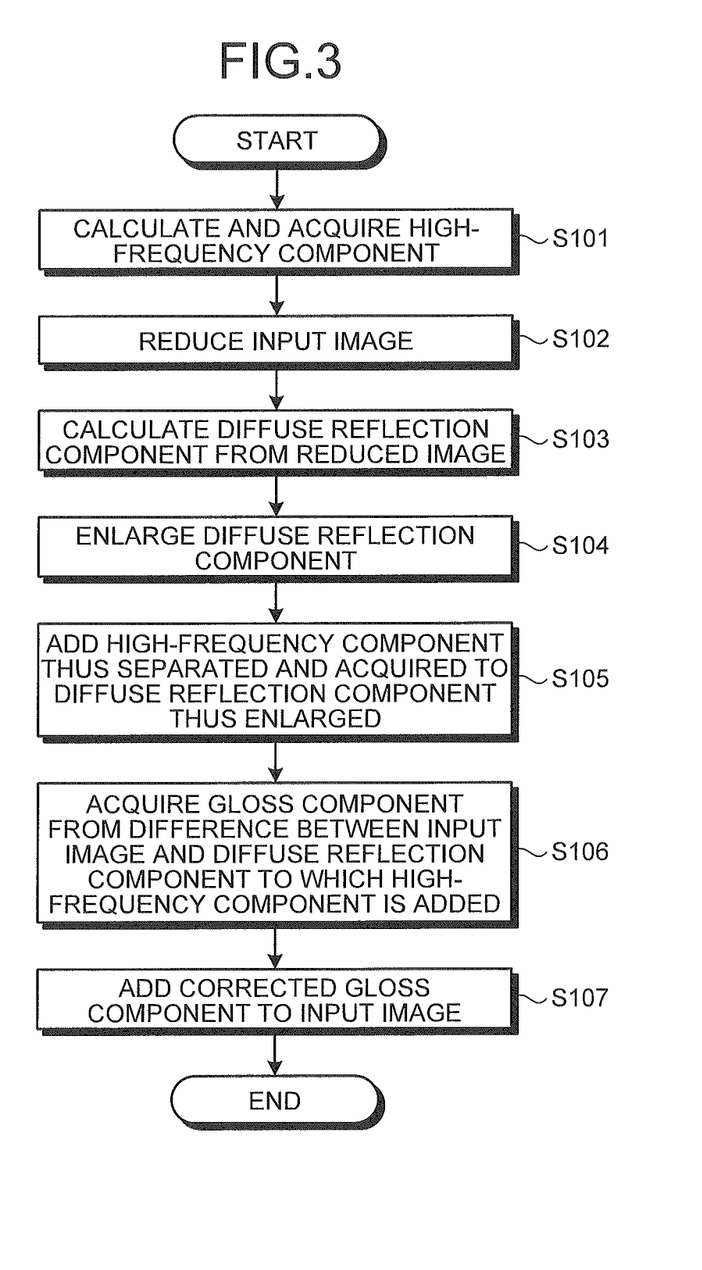
FIG. 3 is an exemplary flowchart of processing for separating a gloss component performed by the image processing apparatus in the embodiment.

The process of the image processing in the first embodiment will now be described with reference to FIG. 3. As illustrated in FIG. 3, the high-frequency acquisition module 14 acquires a high-frequency component lost by reduction from an input image (S101). The reduction module 11 reduces data of the input image (S102). The extraction module 12 calculates and acquires a diffuse reflection component from the reduced image (S103). The enlargement module 13 enlarges the diffuse reflection component thus calculated (S104). The high-frequency addition module 15 adds the high-frequency component separated and acquired by the high-frequency acquisition module 14 to the diffuse reflection component thus enlarged (S105). The gloss component acquisition module 16 acquires a gloss component from difference between the input image and the diffuse reflection component to which the high-frequency component is added (S106). Finally, the gloss component addition module 17 performs desired processing, which is highlight processing for highlighting the gloss component in the first embodiment, on the gloss component thus acquired, and adds the gloss component (S107).

In the image processing apparatus 1 according to the first embodiment, the processing for separating the diffuse reflection component is performed after the input image is reduced. Because the pixels are thinned out in the reduction, it is possible to suppress the processing capacity required for processing related to calculation of the diffuse reflection component that needs to be calculated for each pixel. Furthermore, the high-frequency component lost in the reduction is added to the diffuse reflection component again. As a result, when highlighting the gloss component, it is possible to suppress erroneous highlighting of an edge of the image caused by an increase in difference with the input image if the processing is performed without adding the high-frequency component again.

Second Embodiment

Figure 4:
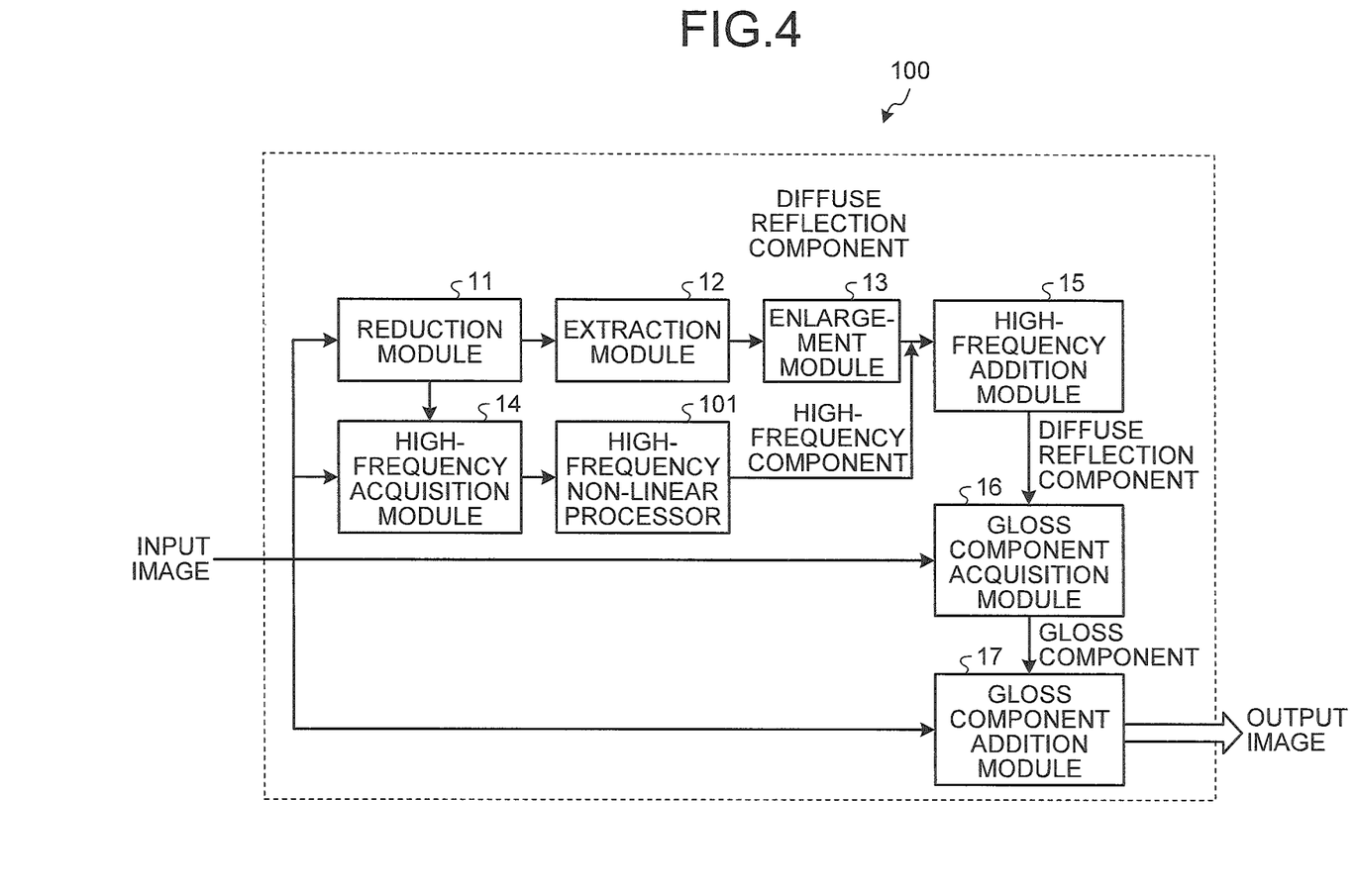
FIG. 4 is an exemplary block diagram of a functional configuration of an image processing apparatus according to a second embodiment.

An image processing apparatus 100 according to a second embodiment will now be described. In the second embodiment, as illustrated in FIG. 4, the image processing apparatus 100 comprises a high-frequency non-linear processor 101 additionally. After the high-frequency non-linear processor 101 corrects the high frequency non-linearly, the high-frequency component thus corrected is added to a diffuse reflection component.

Figure 5:
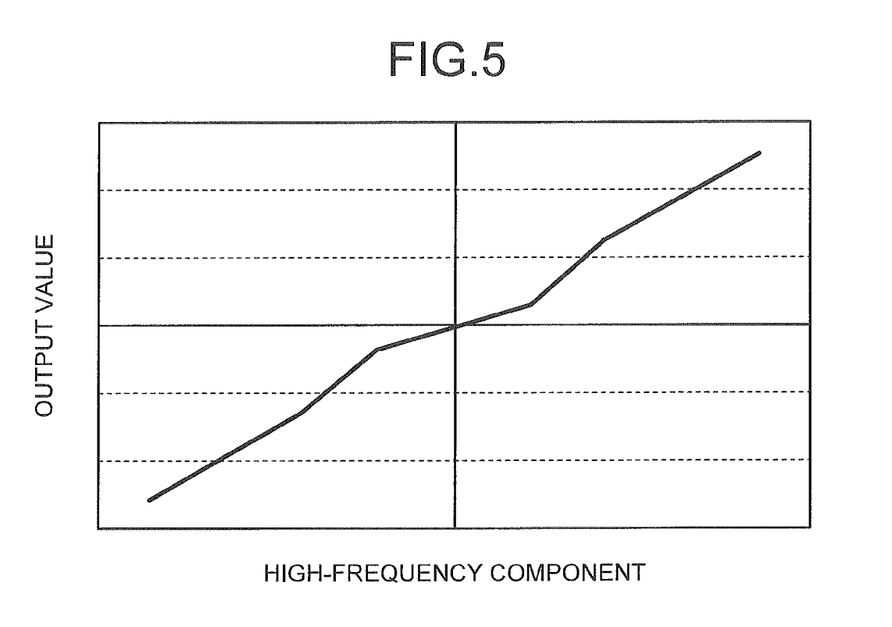
FIG. 5 is an exemplary schematic diagram of a result of non-linear processing of a high-frequency component in the embodiment.

Specifically, an output value specified in advance is set to be output correspondingly to an input value of a high-frequency component. FIG. 5 is a graph of an example of the high-frequency non-linear processing. FIG. 5 illustrates a state in which, if the high-frequency component is relatively small, outputting of the output value is suppressed (a state in which the angle of the graph of the output value is small), for example. Through the processing as illustrated in this example, it is possible to leave a portion of a gloss component as a gloss using the fact that difference of a gloss component is present at a small range with respect to a high frequency of an image.

A high-frequency component acquired by the high-frequency acquisition module 14 contains a portion serving as a gloss component. Thus, if the high-frequency component is added to a diffuse reflection component, the diffuse reflection component partly contains the gloss component. To address this, the image processing apparatus 100 according to the second embodiment suppresses the portion of the gloss component depending on the magnitude of the high-frequency component thus acquired. Therefore, it is possible to suppress removal of the gloss component contained in the high-frequency component and occurrence of a defect in the gloss component.

Third Embodiment

Figure 6:
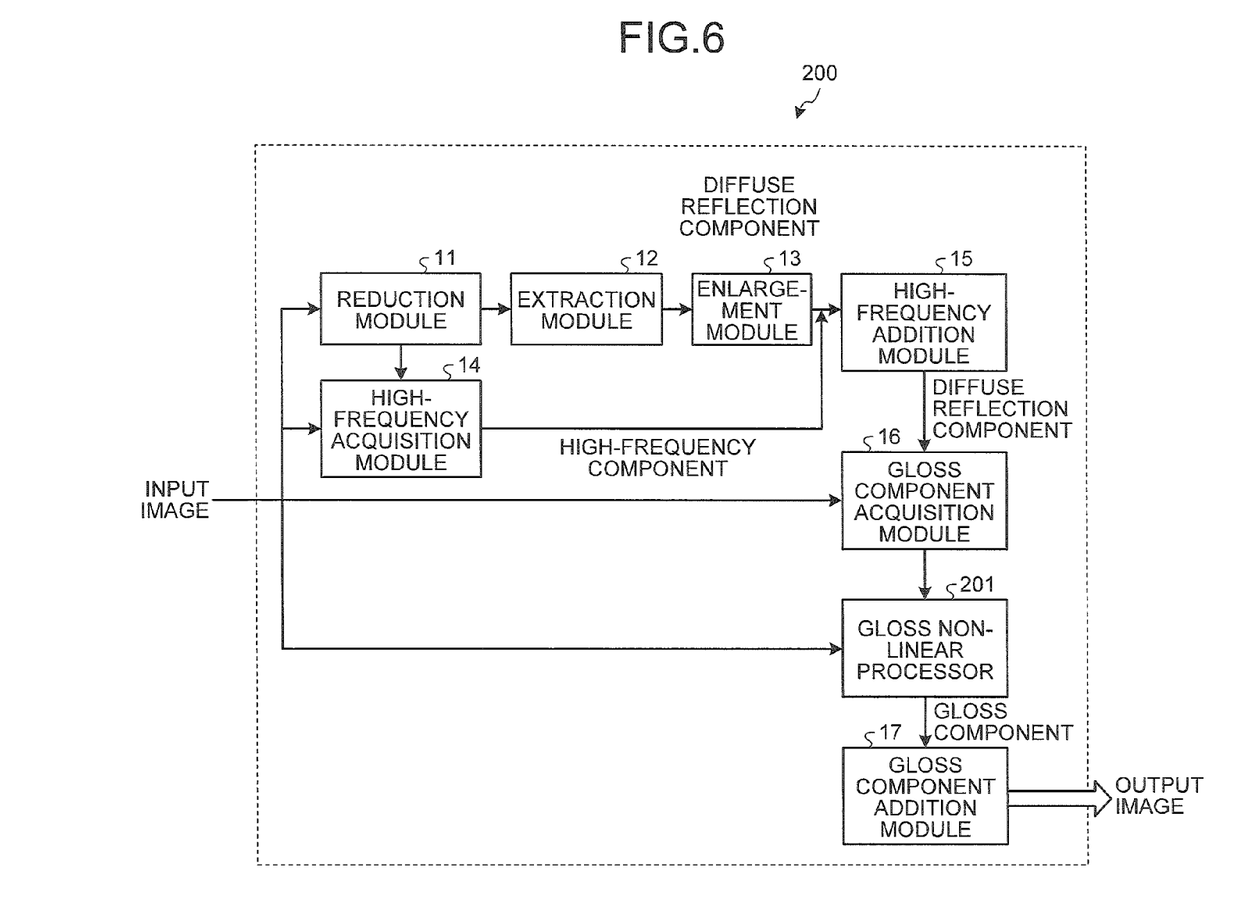
FIG. 6 is an exemplary block diagram of a functional configuration of an image processing apparatus according to a third embodiment.

An image processing apparatus 200 according to a third embodiment will now be described. In the third embodiment, as illustrated in FIG. 6, the image processing apparatus 200 comprises a gloss non-linear processor 201 additionally. After the gloss non-linear processor 201 processes a gloss component to be non-linear, a gloss component thus processed is added to an input image.

Figure 7:
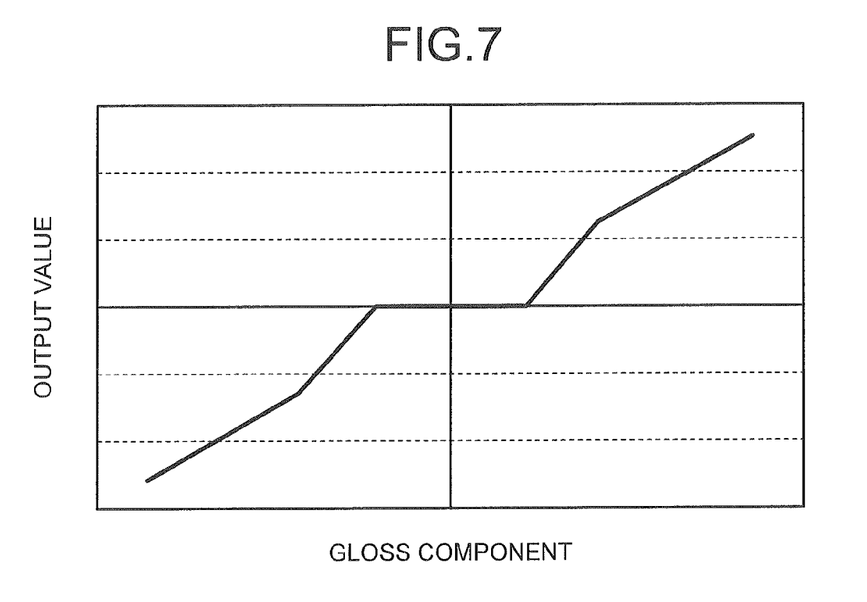
FIG. 7 is an exemplary schematic diagram of a result of non-linear processing of a gloss component in the embodiment.

Specifically, an input-output relationship in the non-linear processing is determined in advance correspondingly to an input value of the gloss component. FIG. 7 illustrates an example of the gloss non-linear processing. In the example, if the gloss component is relatively small, outputting of the output value is suppressed. (the angle with respect to the output value is small). By performing the processing as illustrated in this example, it is possible to prevent the gloss component from being highlighted if the difference of the gloss component is small.

Usually, to perform image processing at high speed, high-speed processing can be achieved by decreasing the gray scale value (number of bits) of the image besides the number of pixels. However, lower bits thus lost are erroneously highlighted as a gloss. To address this, by suppressing the output value in this manner when the gloss component is small, it is possible to suppress erroneous highlighting of the lower bits.

The image processing apparatus 1 according to the first embodiment can be realized by a hardware configuration comprising a control device, such as a CPU, and a storage device, such as a read-only memory (ROM) and a random access memory (RAM), mounted on a chip of a digital camera.

An image processing program of the image processing apparatus 1 according to the first embodiment may be provided as a computer program product in a manner recorded in a computer-readable recording medium, such as a compact disk read-only memory (CD-ROM), a flexible disk (FD), a compact disk recordable (CD-R), and a digital versatile disk (DVD), as a file in an installable or executable format.

The image processing program of the image processing apparatus 1 according to the first embodiment may be provided in a manner stored in a computer connected to a network such as the Internet to be made available for downloads via the network. Furthermore, the image processing program of the image processing apparatus 1 according to the first embodiment may be provided or distributed over a network such as the Internet.

The image processing program of the image processing apparatus 1 according to the first embodiment may be provided in a manner incorporated in a ROM or the like in advance.

The image processing program of the image processing apparatus 1 according to the first embodiment has a module configuration comprising the modules described above. In actual hardware, the CPU (processor) reads and executes the image processing program from the storage medium described above to load the modules on the main memory. Thus, the modules described above are generated on the main memory.

Moreover, the various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing apparatus comprising:
    a reduction module configured to reduce image data that is input to output reduced data;
    an extraction module configured to extract a diffuse reflection component from the reduced data;

an enlargement module configured to enlarge the diffuse reflection component to a size before the reduction of the input image data to output enlarged data;

a high-frequency acquisition module configured to acquire a high-frequency component removed by the reduction from a difference between the input image data and the reduced data;

a high-frequency addition module configured to output first data obtained by adding the high-frequency component acquired to the enlarged data; and a gloss component acquisition module configured to acquire a gloss component from a difference between the input image data and the first data.

2. The image processing apparatus of claim 1, further comprising a gloss component addition module configured to add, after performing predetermined processing on the acquired gloss component, the gloss component to the input image data.

3. The image processing apparatus of claim 2, further comprising:

a high-frequency non-linear processor configured to suppress an output value in an area closer to low frequency in the high-frequency component acquired by the high-frequency acquisition module with respect to the high-frequency component to output non-linear data, wherein the high-frequency addition module is configured to add the non-linear data output by the high-frequency non-linear processor to the enlarged data.

4. The image processing apparatus of claim 2, further comprising:

a gloss non-linear processor configured to output a non-linear gloss component whose output value is suppressed in an area where the gloss component acquired by the gloss component acquisition module is small with respect to the gloss component, wherein the gloss component addition module is configured to add the non-linear gloss component to the input image data.

5. An image processing method comprising:

reducing image data that is input to output reduced data;

extracting a diffuse reflection component from the reduced data;

enlarging the diffuse reflection component to a size before the reduction of the input image data to output enlarged data;

acquiring a high-frequency component removed by the reduction from a difference between the input image data and the reduced data;

outputting first data obtained by adding the high-frequency component acquired to the enlarged data; and acquiring a gloss component from a difference between the input image data and the first data.

* * * * *